Nov. 17, 1925.
A. T. HESPE
1,561,926
THERMOMETER TUBE
Filed Jan. 6, 1925
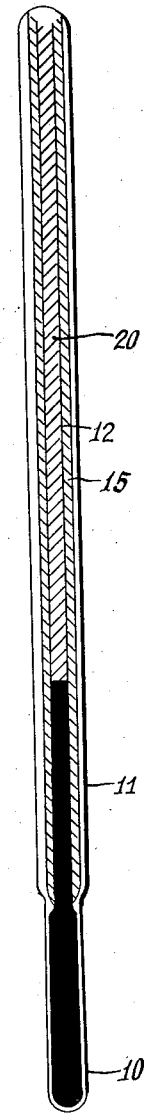
INVENTOR
A. T. Hespe
BY
ATTORNEY Patented Nov. 17, 1925.

1,561,926

UNITED STATES PATENT OFFICE.

ALFRED T. HESPE, OF EAST ORANGE, NEW JERSEY.

THERMOMETER TUBE.

Application filed January 6, 1925. Serial No. 785.

*To all whom it may concern:*

Be it known that I, ALFRED T. HESPE, a citizen of the United States, and resident of the town of East Orange, county of Essex, State of New Jersey, have invented certain new and useful Improvements in Thermometer Tubes, of which the following is the specification.

One of and probably the most trying operation or condition surrounding the use of thermometers and especially lens front thermometers, is the rapid and accurate reading thereof or as it may be termed, the discovery of the location of the top of the mercury column.

After years of study and experimentation, thermometer manufacturers and users have concluded that the only expansible material or element that can be employed in thermometers with a satisfactory degree of efficiency is metallic mercury and that a thermometer tube must be made of particularly clear glass.

The mercury employed must be very pure and clean and it is well known that pure mercury presents a surface of extreme brightness and when such mercury is confined in or caused to pass through a clear glass thermometer tube, the reflection of light rays by the surface of the mercury is so near that of glass that it is difficult to discover the position of the mercury in the tube. It will also be borne in mind that the diameter of the mercury column in relation to the size of the surrounding glass tube is so small that it must be, in many instances, magnified to be easily discovered; and it must further be borne in mind that thermometer tubes are drawn, in manufacture, and that the drawing sets up longitudinal lines, minor reflective surfaces or longitudinal refractive stripes that are not in themselves mechanical or physical ribs, but are, nevertheless optical ribs, probably due to the high refractive index of the glass itself, the refraction being transverse to the longitudinal axis of the tube.

In the past, thermometer manufacturers and users have thought to color the mercury employed, but have found this physically impossible. The placing of a contrasting colored member close to the back of the glass of the tube is also known in the art. They have substituted spirits for the mercury and have found that spirit thermometers, while satisfactory for some purposes are not accurate and cannot be used for extremes, and numerous other expedients have been promulgated for the purpose of making the reading of the thermometer easier.

My invention consists in emphasizing the position of the mercury column, by employing a colored member in the glass of the thermometer tube between the bore and the light shield and preferably in such a manner as to show a panel of color substantially equal in apparent width, as viewed by the observer, to the apparent width of the mercury in the bore.

For the best type of thermometers of this character it is advisable to arrange the colored member with respect to the bore, that its resultant width and position can be controlled during the course of manufacture of the tubing.

In the specification which follows, I will describe the arrangement and operation, which result in the accomplishment of the purposes and the accompanying drawing should be referred to for a complete understanding of the specification.

In the drawing:—

Fig. 1, shows in elevation a form of clinical or industrial thermometer.

Fig. 2, is an end view of the thermometer shown in Fig. 1.

Similar reference numerals indicate like parts in all the figures where they appear.

In Fig. 1, at 10, I show a bulb of a thermometer and formed integral therewith or secured thereto is a glass tube 11, having a central bore 12, through which the mercury or spirit 13 is free to pass.

The broad cross-hatching 15 in Fig. 2 is intended to indicate a longitudinal backing member of colored glass, which is usually and preferably white. It is not usual to make this backing member entirely opaque, but nearly so, so that the light rays passing through this portion will be limited.

The use of a backing member of various colors as shown at 15 is quite common in the art of thermometer making. This member is a longitudinal strip of colored glass, molded and drawn into the wall of the thermometer tube at a desired point, which is usually adjacent to the rounded portion of the prism shaped tube as shown in Fig. 2. The width of this strip may vary. I have previously said that the objects of my invention were to make the lens and thereby the top end of the mercury column more readily discoverable and to thus make the thermometer more readily and more accurately readable.

To accomplish this, I show in Fig. 2, adjacent to the perforation 12, in which the mercury rises and falls, a strip of colored glass or other suitable material shown at 20.

The color of the member 20 may be selected, but should, obviously be a color sharply contrasting with the color of the mercury and that of the light shield 15, and also of a color different from that evidenced in the glass by reflected or refracted rays.

If we assume that ordinary clear glass is used in the manufacture of the thermometer, under most lights, the glass will appear to have a slightly greenish or silver tint; under daylight, the mercury usually has brilliant silver color. Ordinarily the member 15, which I am pleased to call a light shield will be white; to obtain the highest efficiency, then, with this combination, I would make the strip 20 red, pink or orange color.

As shown in Fig. 1, the mercury rising in the bore 12 obliterates the colored member 20 and from the observation side of the thermometer tube, it will appear that an additional means is provided for determining the accurate reading of the thermometer. The operator may read the top edge of the mercury column or the bottom edge of my colored strip 20 and while I realize that these two points are the same and the apparent bottom edge of the strip 20 is produced by the movement of the mercury over the strip; I also know that it is much easier to discover the compound indicating line formed at the junction point between two substances of different color, than it is to discover the top of any member or thing extending into the atmosphere and particularly if the thing or substance be white, gray or any other light color as previously set forth and it is common knowledge that the top edge of the thin mercury column in a thin glass tube is exceedingly difficult to discover.

My experiments have further shown me that my improvement makes possible the accurate use of a thermometer by persons of poor eye sight or persons to a more or less degree color blind and it is, of course, well within the province of my device to make the colors of the members 15 and 20 so contrasting as to make the use of this thermometer possible with persons color blind to a marked degree or with persons having poor eye sight or to meet any peculiar defects of sight.

A satisfactory procedure, according to my invention is the following:—

In the manufacture of the tube shown a small gather of clear glass is arranged on the end of a blow pipe and thereafter a suitable quantity of glass of a contrasting color with respect to that of which the major part of the tube is constituted is placed upon the small gather in such a position that when a bubble is subsequently formed in the glass, by the use of the blow pipe, the colored member will assume the desired position with relation to those parts of the gather which later become the bore and the lens, care being taken that the colored glass retains its proper position during the various manipulations. It will be apparent that the colored glass referred to will constitute but a minor portion of the glass of the final thermometer tubing and that it will be secured in its proper position in a major portion of glass of contrasting color; clear glass constituting the major portion of the tubing. After the minor portion, consisting, as stated, preferably of colored glass, and having a dimension and location which is determined with reference to the bubble or bore and a suitable additional quantity of clear flint glass have been suitably associated with the end of the blow pipe, an air bubble is blown in this gather. This bubble is what eventually becomes the bore of the thermometer tubing; additional flint glass is associated with the gather until it has assumed the desired dimensions. The gather is then somewhat elongated and the bubble naturally follows the shape of the glass. The colored piece of glass is caused to follow the bore and to preserve substantially the same position in relation to the bore.

On that side which brings the colored glass and a substantial amount of flint glass between the bore and the light shield, the elongated gather is then covered, with a strip of white glass and this entire mass is again covered with flint glass, whereupon the material is ready for drawing out to the required diameter. In drawing out the material to the required diameter, the colored glass piece, first mentioned, now permanently associated with the flint glass, becomes extended and elongated simultaneously with the extension and elongation of the bore. The procedure may, obviously, be varied with respect to many details, but the fundamental principle thereof, which will remain the same in all variations, is that a small piece of colored glass is caused to be incorporated in a gather, in such relation to the bubble which ultimately becomes the bore of the tube, that the colored strip and the bore are always extended simultaneously and in relation to each other.

It will be observed that in order to produce the desired product, it is necessary that the colored strip be initially associated with the gather in a definite relation to the bubble, which ultimately becomes the bore and the glass which ultimately becomes the thermometer tube. If this relation is properly established, the colored strip will be extended and its dimensions regulated generally by reason of the physical influences which govern the shaping and elongation of the glass during the final stages of the manufacture of the tubing.

The important consideration is that the visual width of the colored member, such as 20, should approximate the visual width of the bore and it will, therefore, be understood that if the colored member is moved backward from the bore or nearer the light shield, the width of the colored member should be reduced, so that it will not extend materially, out of the visual field of the lens, when observing the bore, that is, the colored member will be, as near as possible, wholly within the observation range of the lens and will appear of substantially no greater width than the bore.

While modifications may be made, within the scope of the appended claims, I prefer the whole as shown and described.

Having carefully and fully described my invention, what I claim and desire to obtain is:—

1. A thermometer tube having a light shield and a colored member arranged between the tube bore and said light shield and separated from both said bore and said light shield by intervening transparent glass.

2. A thermometer tube having a light shield and a colored member arranged between the tube bore and said light shield and separated from both said bore and said light shield by intervening transparent glass, said colored member being of a visual width substantially equal to the width of said bore.

Signed at the city, county and State of New York, this 31st day of December, 1924.

ALFRED T. HESPE.